Dec. 21, 1965  R. HAPPE ETAL  3,225,280
LOAD PROTECTION CIRCUITS
Filed Aug. 12, 1963   3 Sheets-Sheet 1

WITNESS
William Martin Jr.

INVENTORS
Reynold Happe
Lawrence R. Goetz

BY Marshall J. Breen
ATTORNEY

Dec. 21, 1965   R. HAPPE ETAL   3,225,280
LOAD PROTECTION CIRCUITS
Filed Aug. 12, 1963   3 Sheets-Sheet 3

INVENTORS
Reynold Happe
Lawrence R. Goetz

United States Patent Office

3,225,280
Patented Dec. 21, 1965

3,225,280
LOAD PROTECTION CIRCUITS
Reynold Happe, Greenville, S.C., and Lawrence R. Goetz, Morristown, N.J., assignors to The Singer Company, Elizabeth, N.J., a corporation of New Jersey
Filed Aug. 12, 1963, Ser. No. 301,311
4 Claims. (Cl. 318—246)

The present invention relates to load protection circuits and more particularly to circuits employing controlled rectifiers for controlling the flow of current to loads fed from an A.C. supply voltage.

It is customary in the prior art to use thermal cut-outs or current relays having contacts which open the circuits supplying power to the load on the attainment of predetermined load temperature or current which, if continued, would cause permanent damage to the load. These devices must be capable of interrupting large load currents and thus present a contact cost and maintenance problem.

A concept shown and described in U.S. Patent No. 3,071,718 eliminates the above problem by the use of a negative temperature-coefficient resistance shunting the gate-cathode terminals of a controlled rectifier used to supply a load device so as to produce a blocking state in said rectifier when said resistance reaches a low value corresponding to a predetermined high temperature at the load. The resistance is placed physically in good heat transfer relation to the load device to be protected.

However, when this prior art concept is used with a controlled rectifier having variable gating signals supplied thereto for controlling the speed of a motor it is found that the cut-off temperature which should be fixed, varies substantially with the speed-setting. This has the adverse effect of unduly limiting the load which the motor can safely supply.

The above difficulty can be remedied by the circuits of the present invention which use two controlled rectifiers, the first of which controls current to the load and the second of which controls positive gate current to the first rectifier. The second rectifier is rendered blocking responsively to temperature by a thermistor placed at the load and shunting the gate-cathode terminals of the second rectifier and this action cuts off the flow of positive gate current to the first rectifier thus blocking the load current.

It is an object of this invention to provide a protection circuit for a D.C. load device fed from an A.C. supply voltage and controlled by a controlled rectifier, which circuit produces a selective blocking state in said rectifier responsively to a predetermined temperature in said load device.

It is a further object of this invention to provide a combined motor protection and speed control circuit in which controlled rectifiers perform the functions of controlling the speed of and of selectively blocking current flow to the motor for abnormal temperature conditions of said motor.

With the above and other objects in view as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

Figure 1:
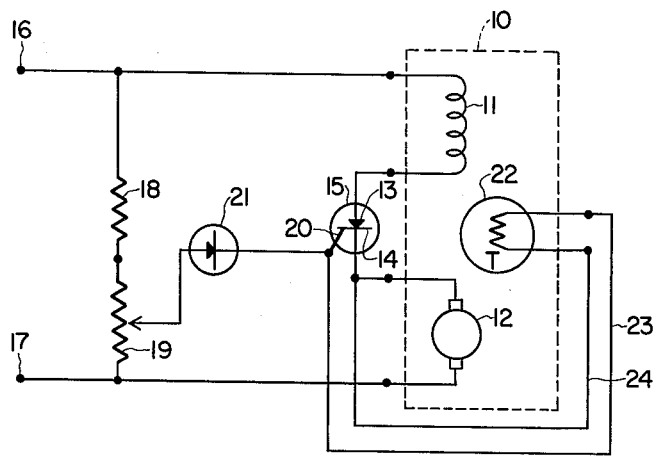
FIG. 1 is a schematic circuit diagram illustrating the prior art concept applied to a motor speed control circuit.

Referring now to FIG. 1, there is shown a motor 10 having a field winding 11 and an armature winding 12 in series with the anode 13 and cathode 14 of a solid state controlled rectifier 15 and a source of A.C. voltage supplied to terminals 16, 17.

A voltage divider comprising a fixed resistor 18 and an adjustable resistor 19 is connected in series across terminals 16, 17 to supply an adjustable reference voltage for the gate 20 of the rectifier 15. A diode 21 is provided in series with the gate 20 and is of such polarity as to permit only positive gate current to flow. The back E.M.F. or speed voltage generated by the armature 12 due to residual field flux is always negative toward the gate so that current will flow into the gate to fire the rectifier only when the reference voltage across resistor 19 is positive and slightly larger than the speed voltage of the armature 12. This is a self-regulating circuit which operates to supply current through the rectifier to the motor to maintain the motor speed such that the speed voltage is substantially equal to the reference voltage across resistor 19. By making this resistor adjustable as shown various predetermined speeds may be set and held by this circuit which is shown and described in U.S. Reissue Patent No. 25,203 assigned to the same assignee as the present invention and to which patent reference may be made for a more complete understanding.

According to the prior art concept referred to above there is added to the above circuit a thermistor 22 which is a resistor of low thermal inertia having a negative temperature-coefficient. The thermistor 22 is placed physically in good heat transfer relation to the motor 10, such as, for example, by embedding it in the field winding 11 or attaching it to a predetermined hot spot in the motor. Electrically the thermistor 22 is connected by conductors 23, 24 so that it shunts the gate-cathode terminals 20, 14 of the rectifier 15.

The effect of the thermistor in this circuit on rising motor temperatures is to shunt more and more current away from the gate until, at some critical limiting safe temperature for the motor, the shunt resistance is so low that sufficient gate current cannot be obtained from the reference voltage to fire the rectifier at which time the rectifier blocks further current flow to the motor until the temperature of motor and thermistor falls sufficiently to increase the shunt resistance and divert enough current to the gate to again fire the rectifier.

Figure 6:
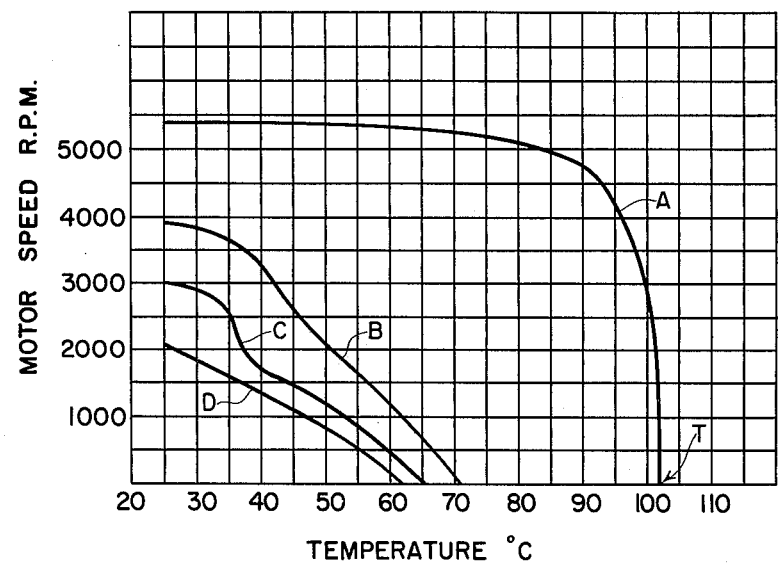
FIG. 6 is a family of curves illustrating the operation of the circuit of FIG. 1.

The circuit of FIG. 1 works well for single speed settings of the resistor 19 and has the advantage of simplicity in such applications, but for other speed settings the cut-off temperatures are adversely affected. This is shown in FIG. 6 wherein the curves show motor speed as a function of thermistor temperature for various speed settings of resistor 19 in the circuit of FIG. 1. The curve A is for maximum speed setting and the curves B, C, and D are for successively lower settings. It will be seen that the cut-off temperatures for curves B, C and D are considerably below the predetermined maximum safe temperature T and represent undesirable limitations on the load the motor can supply with the circuit of FIG. 1 for lower speed settings. That is to say, with these settings, the motor, although protected at all times, might be cut-off long before reaching a predetermined maximum safe temperature due to normal load heating.

It has been found that this adverse variation in cut-off temperature is due to the inherent variation in the resistance in the gate-cathode signal circuit provided by the resistor 19 when variably set for different speeds. This difficulty has been overcome according to the present invention by the use of a second controlled rectifier in which the gate-cathode signal circuit has a fixed resistance, with a thermistor shunting the gate-cathode terminals and using the second controlled rectifier to block the gate current to a first rectifier to cut off current to the load supplied by said first rectifier.

Figure 2:
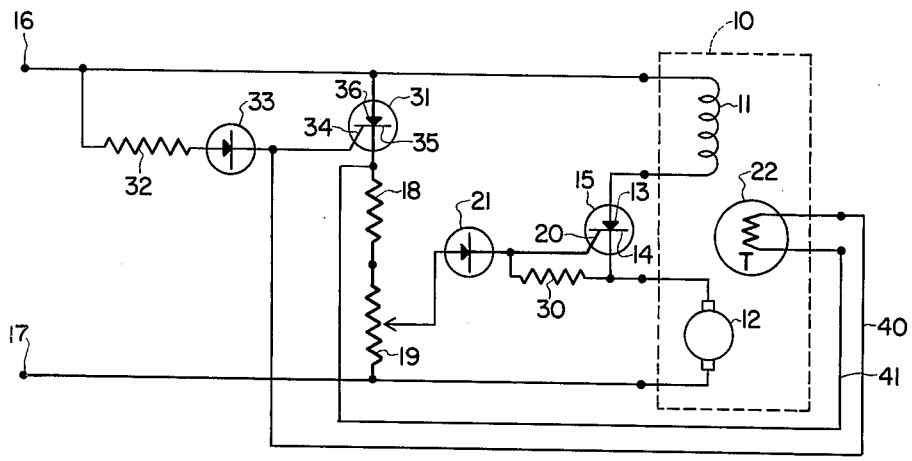
FIG. 2 is a schematic circuit diagram illustrating an embodiment of the present invention.

Such a circuit is shown in FIG. 2 wherein a first controlled rectifier 15 supplies current to the motor windings 11, 12 and the reference voltage is obtained from a resistance divider 18, 19 precisely the same as in FIG. 1 except that in FIG. 2 a fixed calibrating resistor 30 shunts the gate-cathode terminals and a second controlled rectifier 31 controls positive current to the reference circuit 18, 19. The positive gate current for firing the controlled rectifier 31 is supplied from terminals 16, 17 through resistors 32, 18 and 19 and diode 33, and a thermistor 22 is now connected by conductors 40, 41 to shunt the gate-cathode terminals 34, 35 of rectifier 31.

The operation of the circuit of FIG. 2 is as follows:

Normally the rectifier 31 turns on substantially when the anode 36 goes positive in each positive half cycle of the supply voltage at terminals 16, 17. Thus positive current is supplied to the resistance divider 18, 19 from which is obtained the reference voltage for the gate 20 of rectifier 15 which thus operates to control current to motor windings 11, 12 in the same manner as described above in connection with FIG. 1. However, when the motor temperature rises to a maximum safe temperature, the resistance of thermistor 22 drops to such a low value that sufficient gate current to fire rectifier 31 cannot be obtained and it goes into its blocking state thus turning off current to the divider 18, 19. This action cuts off the reference supply for the gate 20 of rectifier 15 which then reverts to its blocking state to cut off current to the motor windings 11, 12 and thus prevents adverse temperature rise thereof.

Figure 7:
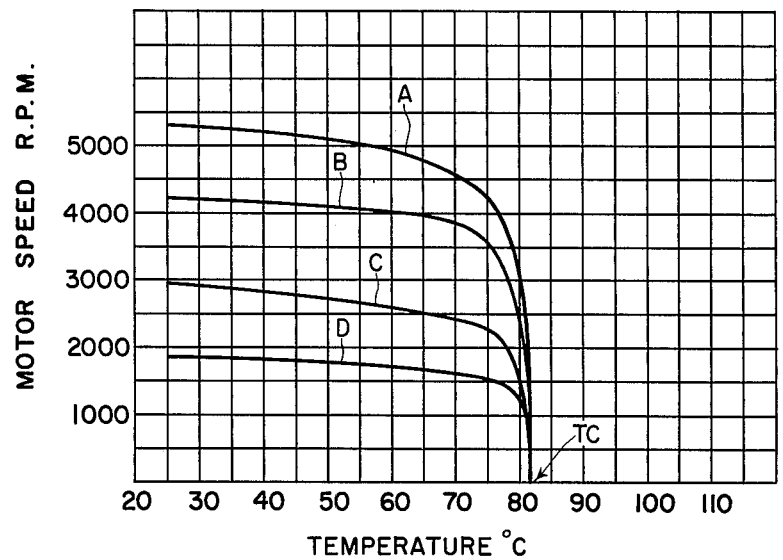
FIG. 7 is a family of curves illustrating the operation of the circuits of FIGS. 2, 3, 4, and 5.

In the circuit of FIG. 2 the temperature at which the rectifier 31 blocks current flow is substantially independent of speed settings of the element 19 and the curves of FIG. 7 show this desirable effect. These curves, which show motor speed as a function of thermistor temperature for various speed settings A, B, C, and D have substantially the same cut-off temperature, Tc, regardless of said setting.

Figure 3:
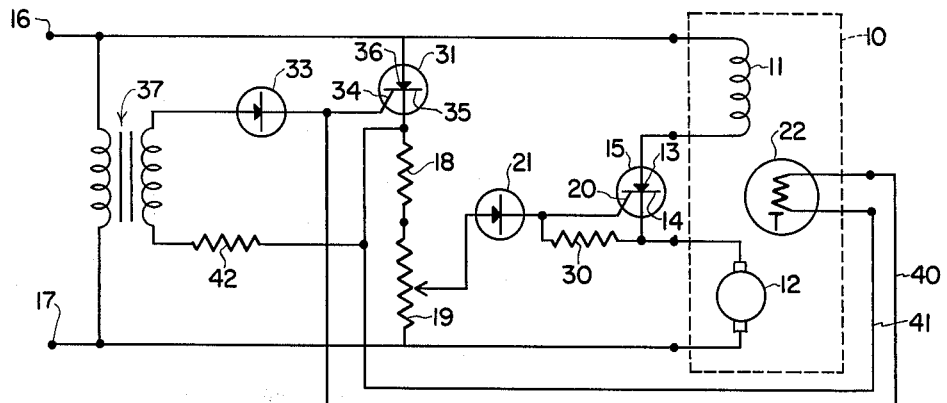
FIG. 3 is a schematic circuit diagram illustrating a modification of the circuit of FIG. 2.

In FIG. 3, a circuit is shown which is substantially the same as that of FIG. 2 except that the gate current for rectifier 31 is obtained from an isolating transformer 37, rather than from direct conductive coupling as in FIG. 2. This isolates the gate circuit from the supply terminals 16, 17 and renders the rectifier 31 less liable to misfiring by extraneous pulses in the supply. Resistor 42 limits the gate current to rectifier 31.

Figure 4:
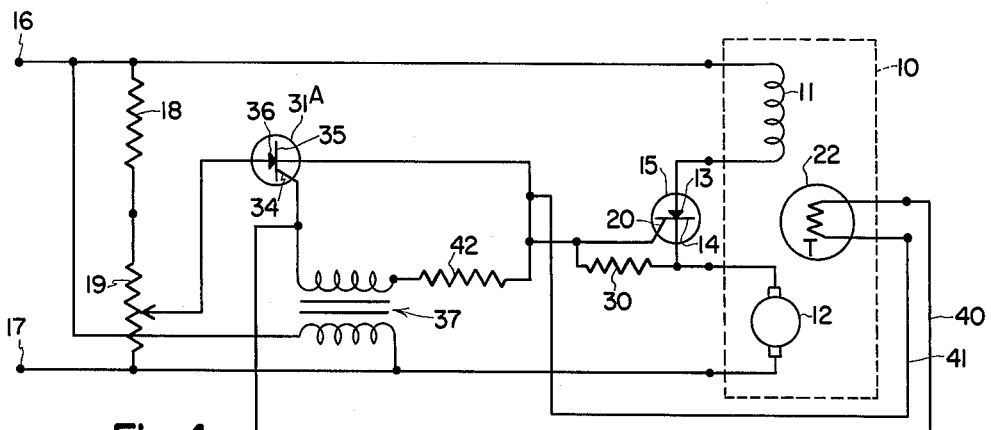
FIGS. 4 and 5 are schematic circuit diagrams showing modifications of the circuit of FIG. 3.

A further modification of the circuit of FIG. 2 is shown in FIG. 4 which is a rearrangement of the elements of FIG. 3 which results in the elimination of the diode 21 and allows the use of a controlled rectifier 31A having a lower peak-inverse-voltage rating and will thus be of lower cost than the rectifier 31 of the circuit of FIGS. 2 and 3. In the circuit of FIG. 4 the rectifier 31A essentially occupies the same position as that occupied by the diode 21 in FIG. 3.

Figure 5:
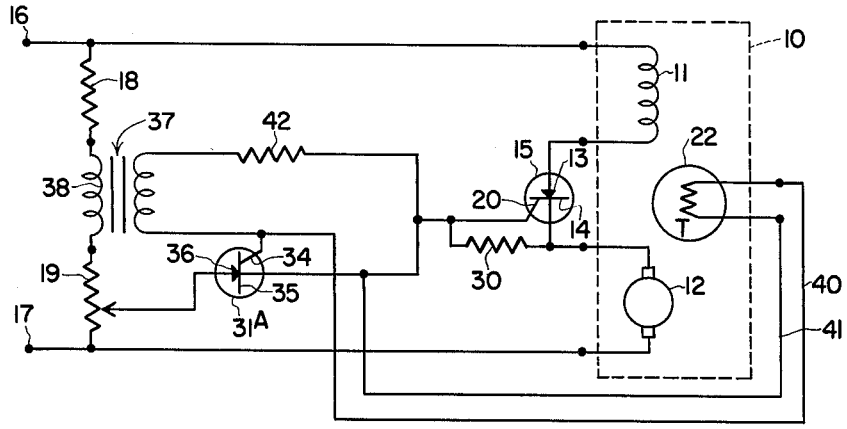

The circuit of FIG. 5 is the same as that of FIG. 4 except that the primary winding 38 of the isolation transformer 37 is in series with the divider circuit 18, 19 and thus its insulation and copper requirements are somewhat less stringent than in FIG. 4.

The fundamental operation of the circuits of FIGS. 3, 4 and 5 are the same as that described above in connection with the circuit of FIG. 2.

It will be understood that the thermistors may be selected for the circuits of the present invention to have resistance-temperature characteristics to provide any predetermined safe cut-off temperature for the specific motor being protected.

Having thus described the nature of the invention what we claim herein is:

1. A combined motor protection and speed control circuit comprising a pair of terminals for connection to an A.C. voltage source, motor windings, a first controlled rectifier, means connecting said motor windings in series with the anode-cathode circuit of the first rectifier and said terminals, adjustable voltage-divider means connected to said terminals for obtaining an adjustable voltage, a second controlled rectifier, means including the anode-cathode circuit of the second rectifier for rendering the adjustable voltage effective to supply adjustable gating signals to the gate-cathode circuit of the first rectifier, means coupled to said terminals for supplying a fixed gating signal to the second rectifier sufficient to cause it normally to fire, and a thermistor connected electrically in shunt with the gate and cathode of the second rectifier and physically located in good heat transfer relation with the motor windings.

2. A circuit according to claim 1 in which the anode-cathode circuit of the second rectifier is in series with the adjustable voltage-divider means and the terminals.

3. A circuit according to claim 1 in which the adjustable voltage-divider means is connected directly to the terminals and the anode-cathode circuit of the second rectifier is in series circuit relation with the adjustable voltage and the gate-cathode circuit of the first rectifier.

4. A circuit according to claim 3 in which the gating signal for the second rectifier is obtained from the secondary of a transformer having its primary connected in series with the voltage-divider and the terminals.

References Cited by the Examiner
UNITED STATES PATENTS

| | | | |
|---|---|---|---|
| 2,939,064 | 5/1960 | Momberg et al. | 318—246 |
| 3,071,718 | 1/1963 | Gordon | 318—473 |
| 3,176,161 | 3/1965 | Vertress. | |

SAMUEL BERNSTEIN, *Primary Examiner.*